United States Patent [19]

Donegan et al.

[11] Patent Number: 4,853,039

[45] Date of Patent: Aug. 1, 1989

[54] PROCESS FOR MAKING A PHTHALOCYANINE PIGMENT DISPERSION

[75] Inventors: Thomas E. Donegan; John H. Bantjes, both of Holland; Timothy G. Leary, Grand Haven, all of Mich.

[73] Assignee: BASF Corporation, Parsippany, N.J.

[21] Appl. No.: 123,670

[22] Filed: Nov. 23, 1987

[51] Int. Cl.$^4$ ............................................. C09B 67/50
[52] U.S. Cl. ..................................... 106/412; 106/413
[58] Field of Search ................... 106/288 Q, 309, 410, 106/412, 413

[56] References Cited

U.S. PATENT DOCUMENTS 4,257,951  3/1981  Matrick ........................... 106/288 Q
4,541,872  9/1985  Jaffe ..................................... 106/309

Primary Examiner—Paul Lieberman
Assistant Examiner—Christine A. Skane
Attorney, Agent, or Firm—Rupert B. Hurley, Jr.

[57] ABSTRACT

A process for making an aqueous pigment dispersion comprising substantially 100 percent $\beta$-phase, isometric copper phthalocyanine pigment particles is carried out by activating a pigment crude, followed by fine-milling the activated crude in the presence of an emulsion, the fine-milling taking place in a stirring mill. The resulting pigment slurry is then isolated as an aqueous presscake.

17 Claims, No Drawings

PROCESS FOR MAKING A PHTHALOCYANINE PIGMENT DISPERSION

FIELD OF THE INVENTION

The process of the present invention pertains to the field of pigment dispersions and dry powders, and further to the field of green-shade copper phthalocyanine blue aqueous pigment dispersions. The process entails the use of both phase-directing solvents and activation, as well as a fine-milling step. Most particularly the process of the invention results in a β-phase pigmentary phthalocyanine blue, substantially 100 percent of which is of an isometric crystal form.

DESCRIPTION OF THE RELEVANT ART

Applicants are aware of four related U.S. patents: U.S. Pat. Nos.: 4,024,154; 3,017,414; 4,257,951; and 4,427,810.

The '154 patent discloses a process of making an activated crude in column 3, lines 3–8. The '154 Patent describes a process of "vigorous stirring" of the activated crude in contact with an organic liquid emulsion which comprises water, a water-immiscible aliphatic hydrocarbon, and a surfactant (column 3, line 58, through column 4, line 60). Example 2 describes a beta-phase phthalocyanine which is first activated, followed by being ball-milled for 72 hours in the presence of ⅛" diameter steel shot, VMP Naptha, water, and surfactant.

The '414 patent describes the activation of phthalocyanine crude. The "second step" disclosed in the '414 Patent is broadly described as a contacting of the crude with an organic liquid emulsion. Example 5 discloses a beta-phase PCN green which is ball-milled for 16 hours in the second step using ⅛" steel shot, using o-dichlorobenzene as the organic liquid, plus water and surfactant. Example 6 describes a phthalocyanine blue which is ball-milled for 24 hours with ⅛" diameter steel shot and tetrachloroethylene.

The '951 patent discloses the process step of making a activated crude. Both the specification and the examples of the '951 patent limit the second step to an agitation step, i.e. without milling. The agitation may be from 15 minutes to 10 hours.

The '810 patent teaches a continuous process for making pigmentary phthalocyanine from a phthalocyanine crude. This process never activates the crude, but rather continually passes the crude through a shot mill for a period which can be as short as 30 minutes. The process utilizes only water, i.e. no organic solvent.

BRIEF SUMMARY OF THE INVENTION

The process of the present invention produces an aqueous pigment dispersion which comprises substantially 100 percent β-phase, isometric pigment particles of copper phthalocyanine blue. The process is carried out by adding a first organic phase-directing solvent to a pigment crude comprising a green-shade (i.e. β-phase) copper phthalocyanine blue pigment crude. The amount of organic phase-directing solvent added is between 2 percent and 10 percent based on the weight of the pigment crude. A mixture is formed by the addition of the first organic phase-directing solvent to the pigment crude. The phase-directing solvent is preferably selected from a group of organic solvents listed below. Once the mixture is formed, the crude within the mixture is activated, which results in the formation of an activated crude. The activated crude is then added to an emulsion. The emulsion comprises water, an effective surfactant, and a second organic phase-directing solvent. The second organic phase phase-directing solvent is selected from the same group as the first organic phase-directing solvent. Both the amount of the emulsion, the proportion of the ingredients within the emulsion, and the selection of the surfactant are together effective to substantially wet-out the activated crude. After the activated crude is wetted-out within the emulsion, it is subjected to a fine-milling step for a period between 15 minutes and three hours. The pigment slurry resulting from the fine-milling step comprises substantially 100 percent β-phase isometric particles of copper phthalocyanine blue. An aqueous pigment presscake is then isolated from the pigment slurry.

DETAILED DESCRIPTION OF THE PREFERRED EMBODIMENTS

The first step of the present invention is the addition of the first phase-directing organic solvent to a pigment crude. The organic solvent and the pigment crude together form a mixture. Although the amount of organic solvent added to the crude may be between 2 percent and 10 percent by weight of pigment crude, it is preferred to use approximately 5 percent solvent, on weight of crude.

The phase-directing organic solvents suitable to the process of the present invention comprise, among others: aliphatic and aromatic hydrocarbons, e.g. petroleum ether, hexane, heptane, octane, decane, benzene, toluene and the xylenes; $C_1$–$C_8$-alkanols, e.g. methanol, ethanol, n- and i-propanol, the butanols, the pentanols, the hexanols and the octanols; $C_2$–$C_4$-diols and their mono-$C_1$–$C_5$-alkyl ethers, the butanediols, monomethyl, monoethyl, monopropyl and monobutyl ethers of ethylene glycol and of 1,2-propylene glycol, diethylene glycol, triethylene glycol and monomethyl, monoethyl, monopropyl and monobutyl ethers of diethylene glycol, triethylene glycol and di-1,2-propylene glycol; cyclohexanol; aliphatic $C_3$–$C_8$-alkanones, eg. acetone, methyl ethyl ketone, diethyl ketone, methyl isopropyl ketone, diisopropyl ketone and methyl isobutyl ketone; aliphatic $C_4$–$C_8$-ethers and cyclic ethers, e.g. diethyl ether, diisopropyl ether, tetrahydrofuran and dioxane; $C_3$–$C_{16}$-alkylamines, e.g. n-and i-propylamine, n-, iso- and sec.-butylamine, hexylamine, octylamine and dodecylamine; aniline derivatives e.g. aniline, N,N-dimethylaniline, the toluidines and the xylidines; carboxylic acid amides of $C_1$–$C_3$-carboxylic acids and their N-mono- or N,N-bis-$C_1$–$C_4$-alkyl derivatives, eg. formamide, N-methylformamide, N,N-dimethylformamide, N,N-dimethylacetamide, N,N-dimethylpropionamide and N,N-dipropylformamide, pyrrolidone, N-methylpyrrolidone and mixtures of the above.

The organic solvents may be used by themselves or in admixture with one another. It is preferred that the organic phase-directing solvents used in the process of the present invention are selected from the group consisting of tetrachloroethylene, quinoline, VMP Naptha, butyl cellosolve, mineral spirits, benzene, pyridine, dichlorobenzene, pinene and turpentine. It is more preferred that the organic phase-directing solvents used in the process of the present invention are selected from the group consisting of tetrachloroethylene, quinoline, VMP Naptha, ethylene glycol monobutyl ether, mineral spirits, benzene, pyridine, and dichlorobenzene.

The most preferred solvent is ethylene glycol monobutyl ether. Both the "first" phase-directing organic solvent and the "second" phase-directing organic solvent are selected from the solvent group described above. The first phase-directing solvent need not be identical to the second phase-directing solvent. Ethylene glycol monobutyl ether is the most preferred solvent for both the first phase-directing solvent and the second phase-directing solvent. The term "pigment crude" refers to the product of the synthesis which leads to the chemical compound which provides the coloration properties to the final crystalline pigment particle. In the case of green-shade (i.e. $\beta$-phase) copper phthalocyanine blue crude, the particulate material making up the crude is significantly larger than pigmentary size. Furthermore, this crude is a dry powder. In contrast, the aqueous pigment dispersion, which is the product of the invention, has pigment-sized particles of copper phthalocyanine dispersed in an aqueous medium. This dispersion is a uniform distribution of solid particles. The size range encompassed by the term "pigmentary" comprises particles from 0.01 micrometers to 100 micrometers in size.

In the process of the invention, the pigment crude is "activated", whereby an activated crude in formed. The activation is carried out on the pigment crude after the pigment crude is mixed with the first phase-directing organic solvent. The activation of the crude within the mixture (of crude and solvent) produces an activated crude mixture. The activation step is preferably carried out by a milling operation, most preferably in a ball mill. The activation step subjects the particulate material in the mixture to a pounding operation. This is preferably done by putting media (preferably Cyl—Pebs) into a ball mill. The mixture of pigment crude and solvent is then added to the ball mill. The ball mill is then rotated, which results in the mixture being pounded by impact of the media against the mixture. The effect of the impact is to break the individual crystal size down into the pigmentary size range. However, while the crystals are being broken into smaller particles, they also tend to agglomerate, i.e. form tightly-bound clumps of very small particles. The activated crude, i.e. the product of the activation step, is comprised of tightly-bound agglomerates of pigment-sized particles.

After activation, the resulting activated crude mixture is added to an emulsion. The emulsion comprises water, an effective surfactant, and a second phase-directing organic solvent. The second phase-directing organic solvent is selected from the group of solvents used in making the mixture described above (i.e. the "second" phase-directing organic solvent is selected from the same group of solvents as the "first" phase-directing organic solvent).

The amount of emulsion to which any given amount of activated crude should be added is an amount effective to "wet out" the activated crude. The phrase "wet-out" means to surround with liquid. In other words, an amount effective to wet-out means enough emulsion to surround each pigment particle with liquid.

The effective surfactant must be selected so that: (1) the amount of the emulsion; and (2) the proportions of each of the ingredients within the emulsion; and (3) the effective surfactant, are together effective to substantially wet-out the activated crude. The inventors know that there are many surfactants which are effective when used in certain proportions, and the inventors believe that there are certain surfactants which are ineffective regardless of proportion used. Surfactants known to be effective are: Aerosol OT (a dioctyl ester of sodium sulfosuclinic acid), Strodex 70, Strodex 90 (a potassium salt of an organic ester acid anhydride anhydride), dodecylbenzene sulfonic acid, and aminomethylpropylamine. Aerosol OT is the most preferred of these effective surfactants.

For different solvents and surfactants, and for different proportions of these ingredients making up the emulsion, the amount of emulsion effective to wet-out a given amount of any given activated crude will vary. The minimum amount of emulsion to be used in the process is that amount which is effective to wet-out substantially all of the pigment particles within the activated crude.

The proportions of the ingredients used to make the emulsions may be varied. Both the proportions of ingredients within the emulsion, the amount of emulsion per unit mass activated crude and the effective surfactant must be selected so that all of the activated crude is substantially wetted-out in the process of the invention. The selection of an operable amount of emulsion, an operable proportion of ingredients within the emulsion and an effective surfactant can easily be done by one of skill in the art. Furthermore, detailed examples below suggest amounts, proportions, and selected ingredients which enable one to carry out preferred processes within the scope of the present invention. Preferably the emulsion comprises between 2 and 20 parts of activated pigment crude and between 0.5 and 3.0 parts surfactant and between 69 and 94 parts water and approximately 3.5 parts of the second organic solvent.

After the activated crude has been wetted-out within the emulsion, the emulsion and wetted-out crude therein are both subjected to a "fine-milling" operation. The "fine-milling" operation is carried out with the use of a "stirring mill" and media. A "stirring mill" is herein defined as an Attritor-type of mill, or its equivalent. Ball mills, vibratory mills, and rod mills are inoperable substitutes for a stirring mill in the process of the present invention. Stirring mills have a means for stirring the mixture of media plus ingredients placed therein. Most preferably, the stirring mill is an Attritor. The stirring function is necessary in order to carry out the process within the time period specified in the process of the invention, i.e. in a time period between 15 minutes and 3 hours. Without the stirring function, the product (substantially 100 percent $\beta$-phase, isometric copper phthalocyanine blue pigment particles) cannot be formed in 3 hours or less. The fine-milling operation requires that media are within the stirring mill during the milling operation. Preferably the media are metal shot having a diameter of approximately 2 mm, and preferably the shot are stainless steel. The fine milling is carried out so that the product resulting therefrom, a fine-milled activated crude, is substantially 100 percent $\beta$-phase copper phthalocyanine blue isometric pigment crystals. It is necessary to select the stirring rate, the amount of media, and the size of the media so that the desired product results. The selection of an operable combination of the stirring rate, amount of media, and size of media to achieve the product of the invention can easily be done by one of skill in the art. Furthermore, detailed examples below suggest mill types, stirring rates, media amounts, type, and size to enable one to carry out a preferred process within the scope of the present invention. The fine milling step breaks down the agglomerates formed in the activation step, resulting in the dispersion of the individual pigment particles.

Following the fine-milling step, the resulting fine-milled activated crude (herein termed the "pigment slurry")is isolated in an aqueous presscake. The isolation of the pigment slurry is preferably effectuated by performing the following steps:

(1) diluting the pigment slurry with water;
(2) acidifying the diluted slurry to a pH between 1 and 2;
(3) heating the slurry to a temperature of 75° C. to 95° C.;
(4) filtering the slurry whereby the pigment crystals are substantially separated from the liquid phase; and
(5) rinsing the pigment crystals with water whereby and aqueous presscake is isolated.

The aqueous presscake may then be dried, whereby a dry pigment toner is obtained.

EXAMPLE 1

A ball mill having a 2½ gallon capacity was charged with 33 pounds of steel media (Cyl Pebs). To the mill was added 906 grams of chlorine free crude copper phthalocyanine and 45 grams of turpentine. The mill was then sealed and rotated for 24 hours at 70 percent of the critical speed. The mill generated some heat but was not a factor in the crude preparation. The powder was discharged from the mill yielding a 98 percent recovery of the total charge.

A laboratory Attritor containing 2 millimeter stainless steel balls was charged with 160 grams of water, 12.5 grams of turpentine and 2.8 grams of Aerosol OT (75%). The mill was agitated until the emulsion was complete, usually 2-3 minutes. While the mill was agitating at 375 RPMs, 40 grams of the crude from Example 1 were added and milling was continued for 30 minutes. The media was isolated from the pigment slurry by filtering through a screen.

The pigment slurry was then added to 1 liter of water containing sufficient hydrochloric acid to produce a pH of from 1.0-2.0. The slurry was then heated with steam to 75°-95° C. for thirty minutes, filtered, washed acid free and dried.

The finished product was evaluated in an oil ink. The product was found to be similar in strength, cleanliness, and hue when compared with the same pigment crude which had been salt ground in a dough mixer for 9 hours.

EXAMPLE 2

The process of Example 1 was again carried out except that the turpentine was replaced with quinoline.

EXAMPLE 3
(Comparative)

Using a high speed mixer, trade named Arde-Barinco, a 3-liter beaker was charged with 640 grams of water, 40 grams of turpentine and 11.2 grams of Aerosol OT (75%). The mixer was agitated until emulsification was complete. While agitating the mixer at 4000 RPMs, 160 grams of the crude from Example 1 was added and the mixing was continued for three hours. After three hours of mixing the slurry was discharged into 3 liters of water containing sufficient hydrochloric acid to produce a pH of 1.0 to 2.0. The slurry was then heated at 75°-95° C. for one (1) hour, filtered, washed acid free and dried.

When evaluated as an oil ink, the product was similar in color properties to the same crude salt ground in a dough mixer or similar apparatus. Micrographs show the particles as uniform but somewhat acicular.

EXAMPLE 4
(Comparative)

165 Grams of copper phthalocyanine were mixed with 1320 grams of microsized salt (sodium chloride) and 225 ml of diethylene glycol. The mixture was ground for 9 hours at 175° F.–185° F. in a 0.75 gallon Baker-Perkins dough mixer. Diethylene glycol was added as needed to maintain a consistent mass. 400 Grams of the resulting cake was digested in 1 liter of water containing 15 ml of concentrated HCl (or sufficient HCl to bring the pH to 1-1.5). The digested mass was then heated to 90° C. for 1 hour and then filtered, after which the product was washed with water until the product was salt-free and pH-neutral. The crystalline product, a substantially 100 percent $\beta$-phase pigmentary copper phthalocyanine, was then dried.

The products of the above Examples were compared using electron micrographs. The crystalline products of Example 1, 2 and 4 were all characterized as isometric. However, the product of Example 3 was characterized as "somewhat acicular" (i.e. somewhat needle-shaped). It should be noted that the process of the present invention, as exemplified by Examples 1 and 2, produced the same isometric crystals as the salt grinding process, (i.e. Example 4) but the process of Examples 1 and 2 took far less time than the process of Example 4.

The embodiments of the invention in which an exclusive privilege or property is claimed are defined as 1. A process for producing an aqueous pigment dispersion comprising:
   (a) adding a first phase-directing organic solvent to a pigment crude whereby a mixture is formed, the amount of phase-directing solvent added being between 2 percent and 10 percent by weight of crude, the pigment crude comprising a green shade copper phthalocyanine blue crude;
   (b) activating the crude within the mixture whereby an activated crude mixture is formed;
   (c) adding the activated crude mixture to an emulsion, the emulsion comprising water, an effective surfactant, and a second phase-directing organic solvent, wherein the amount of the emulsion, the proportions of ingredients within the emulsion and the surfactant are together effective to substantially wet-out the activated crude;
   (d) fine-milling the activated crude which has been wetted-out within the emulsion, the fine milling taking place within a stirring mill, the fine milling producing a pigment slurry, the fine milling being continued for a period between 15 minutes and 3 hours, so that substantially 100 percent $\beta$-phase, isometric copper phthalocyanine pigment particles are formed; and
   (e) isolating an aqueous presscake from the pigment slurry.

2. The process as described in claim 1 wherein both the first phase-directing organic solvent and the second phase-directing organic solvent are selected from the group consisting of tetrachloroethylene, quinoline, VMP, Naptha, butyl cellosolve, mineral spirits, benzene, pyridine, dichlorobenzene and turpentine, and the surfactant used in the emulsion is selected from the group consisting of a dioctyl ester of sodium sulfoscuccinic acid, a potassium salt of an organic polyphosphoric ester acid anhydride, a dodecyclbenzene sulfonic acid and an amino methylpropylamine.

3. The process as described in claim 1 wherein both the first organic solvent and the second organic solvent are selected from the group consisting of tetrachloroethylene, quinoline, VMP Naptha, ethylene glycol monobutyl ether, mineral spirits, benzene, pyride, pyridine, and dichlorobenzene, and the surfactant used in the emulsion is selected from the group consisting of a dioctyl ester of sodium sulfosuccinic acid, a potassium salt of an organic polyphosphoric ester acid anhydride, a dodecylbenzene sulfuric acid, and an amino-methylpropylamine.

4. The process as described in claim 2 wherein the stirring mill is an Attritor.

5. The process as described in claim 2 wherein the aqueous pigment presscake is dried, whereby a dry toner is produced.

6. The process as described in claim 2 wherein the amount of the first organic solvent is approximately 5 percent based on the weight of the pigment crude.

7. The process as described in claim 2 wherein the emulsion comprises between 2 and 20 parts of activated pigment crude and between 0.5 and 3.0 parts surfactant and between 69 and 94 parts water and approximately 3.5 parts of the second organic solvent.

8. The process as described in claim 2 wherein the isolation is carried out by:

(a) diluting the slurry with water; and (b) acidifying the diluted slurry to a pH between 1 and 2;

(c) heating the slurry to a temperature of 75° C. to 95° C.;

(d) filtering the slurry whereby the pigment crystals are substantially separated from the liquid phase; and (e) rinsing the pigment crystals with water whereby an aqueous pigment presscake is isolated.

9. The process as described in claim 3 wherein the stirring mill is an Attritor.

10. The process as described in claim 3, wherein the aqueous pigment presscake is dried, whereby a dry toner is produced.

11. The process as described in claim 3 wherein the amount of the first organic solvent is approximately 5 percent based on the weight of the pigment crude.

12. The process as described in claim 3 wherein the emulsion comprises between 2 and 20 parts of activated pigment crude and between 0.5 and 3.0 parts surfactant and between 69 and 94 parts water and approximately 3.5 parts of the second organic solvent.

13. The process as described in claim 3 wherein the isolation is carried out by:

(a) diluting the slurry with water; and acidifying the diluted slurry to a pH between 1 and 2;

(c) heating the slurry to a temperature of 75° C. to 95° C.;

(d) filtering the slurry whereby the pigment crystals are substantially separated from the liquid phase; and (e) rinsing the pigment crystals with water whereby an aqueous pigment presscake is isolated.

14. The process as described in claim 4 wherein the fine-milling operation is completed in approximately 30 minutes.

15. The process as described in claim 8 wherein the emulsion comprises between 2 and 20 parts of activated pigment crude and between 0.5 and 3.0 parts surfactant and between 69 and 94 parts water and approximately 3.5 parts of the second organic solvent.

16. The process as described in claim 15 wherein the stirring mill is an Attritor.

17. The process as described in claim 16 wherein the solvent is ethylene glycol monobutyl ether, the pigment crude consists of copper phthalocyanine blue crude, and the surfactant is a dioctyl ester of sodium sulfosuccinic acid.

* * * * *